US008885623B2

(12) United States Patent
Mondal

(10) Patent No.: US 8,885,623 B2
(45) Date of Patent: Nov. 11, 2014

(54) AUDIO COMMUNICATIONS SYSTEM AND METHODS USING PERSONAL WIRELESS COMMUNICATION DEVICES

(75) Inventor: Umasankar Mondal, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 247 days.

(21) Appl. No.: 13/240,222

(22) Filed: Sep. 22, 2011

(65) Prior Publication Data

US 2013/0077609 A1      Mar. 28, 2013

(51) Int. Cl.
*H04W 84/02*      (2009.01)
*H04M 1/725*      (2006.01)
*H04M 1/60*      (2006.01)

(52) U.S. Cl.
CPC .......... *H04M 1/7253* (2013.01); *H04M 1/6058* (2013.01); *H04M 1/6066* (2013.01)
USPC ........ 370/338; 370/328; 370/310; 455/412.1; 455/414.3; 455/41.3; 381/82

(58) Field of Classification Search
CPC ............ H04M 1/6058; H04M 1/7253; H04M 1/6066; H04W 84/02
USPC .................. 370/328–329, 331; 381/1, 77, 82; 455/3.01, 3.06, 41.3, 161.1, 412.1; 709/228, 230, 246
See application file for complete search history.

(56) References Cited

U.S. PATENT DOCUMENTS

| | | | |
|---|---|---|---|
| 8,222,507 B1 * | 7/2012 | Salazar et al. .................. 84/602 |
| 2006/0026302 A1 * | 2/2006 | Bennett et al. ................ 709/246 |
| 2007/0142944 A1 * | 6/2007 | Goldberg et al. ............... 700/94 |
| 2008/0320197 A1 * | 12/2008 | Kumar .......................... 710/304 |
| 2010/0285750 A1 * | 11/2010 | Simonelic .................... 455/41.3 |
| 2013/0089026 A1 * | 4/2013 | Piper et al. .................... 370/328 |

* cited by examiner

*Primary Examiner* — Charles C Jiang
*Assistant Examiner* — Mohamed Kamara
(74) *Attorney, Agent, or Firm* — Morris Manning & Martin, LLP; Tim Tingkang Xia, Esq.

(57) ABSTRACT

According to one aspect, a communications system is disclosed. In one embodiment, the communications system includes a managed communications module that is executable on a personal communications device. The managed communications module is operative to, when executed by a processor, receive input data associated with sound from a user of the personal communications device and to cause the personal communications device to send audio output data including the input data over a local wireless network link. A management module that is executable on a management computer is operative to, when executed by a processor, receive the audio output data and to perform at least one audio data processing function to generate processed audio data. The management module is also operative to, when executed, cause the management computer to send the processed audio data to the managed communications module over the local wireless network link.

17 Claims, 4 Drawing Sheets

AUDIO COMMUNICATIONS SYSTEM AND METHODS USING PERSONAL WIRELESS COMMUNICATION DEVICES

FIELD OF THE INVENTION

The present invention generally relates to audio communications systems, and more particularly to a system and methods for audio communications using personal wireless communication devices.

BACKGROUND OF THE INVENTION

Audio communication systems in the context of small scale performances for drama or other performing arts often use overly elaborate and expensive audio systems to coordinate the audio communication from each performer to the audience. For example, specialized wireless microphones and audio receivers that operate to selectively distribute the related speech and/or music may require systems that, although adequate, may be overly complex for the basic needs in such small settings. In the context of audience lectures, for example a moderated panel discussion, expensive specialized audio equipment is typically used. In the current technology space for consumer electronic communications devices, most professionals own and regularly use smartphones that are capable of wireless communications for both telephone functions and computing functions that were formerly associated only with dedicated computing systems such as desktop or laptop personal computers. Current smartphones are typically operative to provide network-based services to the user, such as internet-based services over local networks via Wi-Fi. Further, smartphones come factory-equipped with microphone and speaker components to receive ambient sound such as spoken word, and to output received sound data from remote sources to the user, respectively. Also, many smartphones are equipped with audio input connectors such as auxiliary audio input and output jacks that accommodate external personal small microphones, as well as audio output connectors to headphones associated with the user. Further, many smartphones have functionality for short-range wireless communication between the smartphone and a wireless headset, for example a Bluetooth® protocol headset with microphone and earphones. These are commonplace features that already exist for smartphone users. Accordingly, performers and lecturers already possess wireless communications devices with audio system functionality. These tools are capable of functioning over an existing local network to operate in conjunction with local personal computers such as wireless-equipped laptop computers. There exists a need for enabling inexpensive yet sufficiently sophisticated local audio system functionality with existing personal communication tools.

Therefore, a heretofore unaddressed need still exists in the art to address the aforementioned deficiencies and inadequacies.

SUMMARY OF THE INVENTION

By practicing one or more aspects of the present invention disclosed herein in various exemplary embodiments, an audio communications system and related methods are provided for use with existing personal communications devices such as smartphones, by utilizing the inherent functionality of the smartphones operating over existing local area networks or by Ad-hoc type network arrangements formed through the combination of personal devices. By executing applications in the form of installable program modules on the smartphones and by using a coordinating management device such as a laptop computer executing a management application, an inexpensive local audio system is provided.

In one aspect, the present invention relates to a communications system. In one embodiment, the communications system includes a managed communications module that is executable on a personal communications device. The managed communications module is operative to, when executed by a processor, receive input data associated with sound from a user of the personal communications device and to cause the personal communications device to send audio output data including the input data associated with sound from the user over a local wireless network link. The communications system also includes a management module that is executable on a management computer. The management computer is separated from the personal communications device, and the management module is operative to, when executed by a processor, receive the audio output data from the managed communications module over the local wireless network link and to perform at least one audio data processing function on the received audio output data to generate processed audio data. The management module is also operative to, when executed, cause the management computer to send the processed audio data to the managed communications module over the local wireless network link. The processed audio data includes data configured for the managed communications module and also data configured for sound output by a sound output means that is separated from the portable communications device.

In one embodiment, the managed communications module is further operative to, when executed, receive the input data associated with the sound from the user via at least one of a microphone, audio input connector and short-range wireless communications interface of the personal communications device.

In one embodiment, the managed communications module is further operative to, when executed, receive the data configured for the managed communications module over the local wireless network link and to cause the personal communications device to output sound to the user based on the received data configured for the managed communications module.

In one embodiment, the function of causing the personal communications device to output sound to the user includes causing a sound output speaker of the personal communications device to output the sound to the user and/or causing a sound output connector or short-range wireless communications interface of the personal communications device to send user output data to a user sound output means over an audio cable or short-range wireless communications link, respectively.

In one embodiment, the short-range wireless communications interface and short-range wireless communications link are configured for Bluetooth protocol communications.

In one embodiment, the local wireless network link includes an ad-hoc network or a local area network (LAN) connection.

In one embodiment, the management module is further operative to, when executed, identify and authenticate the personal portable communications device.

In one embodiment, the audio data processing functions include noise filtering and/or bit-rate adjustment.

In one embodiment, the personal communications device is operative as a telephone.

In one embodiment, the sound output means separated from the personal communications device includes a loudspeaker that is operatively coupled to the management computer.

In another aspect, the present invention relates to a communications system. In one embodiment, the communications system includes a plurality of managed communications modules that are each executable on a corresponding one of a plurality of personal communications devices. Each of the managed communications modules is operative to, when executed by a processor, receive input data associated with sound from a corresponding user of a plurality of users of the personal communications devices and to cause the corresponding personal communications device to send audio output data including the input data associated with the sound from the corresponding user over a local wireless network link. The communications system also includes at least one management module that is executable on at least one corresponding management computer. The at least one management module is operative to, when executed by a processor, receive the audio output data from each of the plurality of managed communications modules over the local wireless network link. The at least one management module is further operative to, when executed, perform at least one audio data processing function on the received audio output data to generate processed audio data, and/or to cause the at least one management computer to send the processed audio data to the managed communications modules over the corresponding local wireless network links. The processed audio data includes data configured for each particular one of the managed communications modules and data configured for sound output by at least one sound output means physically separated from the portable communications devices.

In one embodiment, performing the at least one audio data processing function includes generating a particular set of audio data for each one of the plurality of managed communications modules. At least one particular set of audio data for at least one corresponding managed communications module is different from at least one other particular set for another at least one of the managed communications modules.

In one embodiment, each one of the managed communications modules is operative to, when executed, receive the corresponding set of audio data for the corresponding managed communications module and to cause the personal communications device to output sound to the corresponding user based on the received set of audio data.

In one embodiment, the function of causing each of the personal communications devices to output sound to the user includes causing a sound output speaker of the personal communications device to output the sound to the user and/or causing a sound output connector or short-range wireless communications interface of the personal communications device to send user output data to a user sound output means over an audio cable or short-range wireless communications link, respectively.

In one embodiment, the managed communications module for each one of the personal communications devices is operative to, when executed, receive the audio input data associated with the sound generated by the user via at least one of a microphone, audio input connector, and short-range wireless communications interface of the personal communications device.

In one embodiment, the local wireless network link includes an ad-hoc network or local area network (LAN) connection.

In one embodiment, each of the plurality of personal communications devices is operative as a telephone.

In yet another aspect, the present invention relates to a method for enabling audio communications. In one embodiment, the method includes the step of installing a managed communications module on a personal communications device. The managed communications module is operative to, when executed by a processor, perform functions that include receiving input data associated with sound from a user of the personal communications device and causing the personal communications device to send audio output data including the input data associated with sound from the user over a local wireless network link. The method also includes the step of installing a management module on a management computer that is separated from the personal communications device. The management module is operative to, when executed by a processor, receive the audio output data from the managed communications module over the local wireless network link and to perform at least one audio data processing function on the received audio output data to generate processed audio data. The management module is also operative to, when executed, cause the management computer to send the processed audio data to the managed communications module over the local wireless network link. The processed audio data includes data configured for the managed communications module and data configured for sound output by a sound output means separated from the portable communications device.

In one embodiment, the managed communications module is further operative to, when executed, receive the input data associated with the sound from the user via at least one of a microphone, audio input connector, and short-range wireless communications interface of the portable communications device.

In one embodiment, the managed communications module is further operative to, when executed, receive the data configured for the managed communications module over the local wireless network link and to cause the personal communications device to output sound to the user based on the received data configured for the managed communications module.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
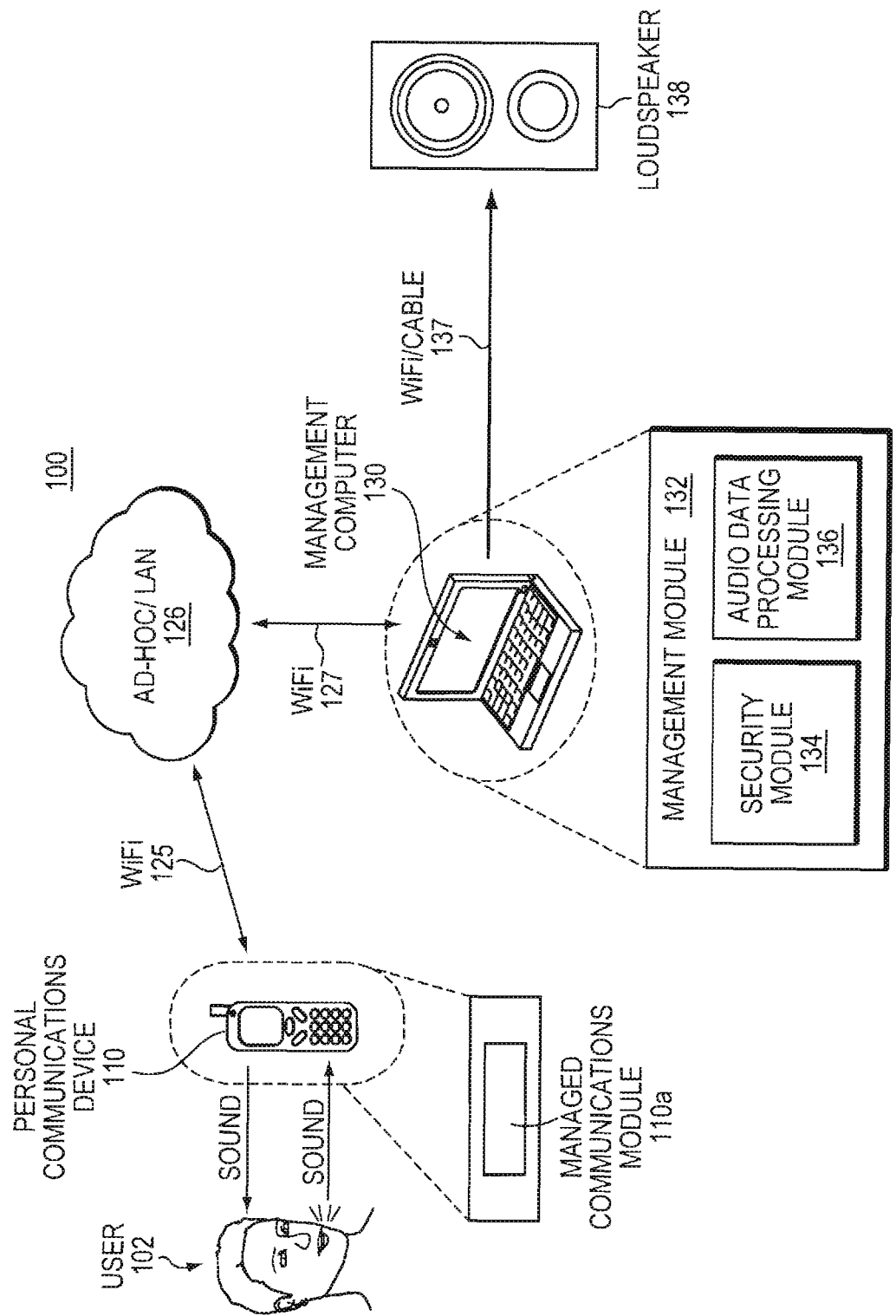
FIG. 1 schematically shows an audio communications system according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. The description will be made as to the embodiments in conjunction with the accompanying drawings in FIGS. 1-4.

Now referring specifically to FIG. 1, an audio communications system 100 is schematically shown, according to one embodiment of the present invention. The audio communications system 100 includes a managed communications module 110a that is executable on a personal communications device 110. As used herein, a "module" refers generally to computer-executable program modules including routines, programs, components, data structures, and other types of structures that perform particular tasks or implement particular abstract data types. The communications modules that are executable on personal communications devices, as disclosed in embodiments herein, may be installed on the device after a direct download of the program module has taken place. For example, the communications module may be in the form of an "app" that is available for purchase and wireless download from an online retailer, such as the online "App Store" managed by Apple® Corporation for use on the iPhone® series of personal communication devices. Alternatively, the program module may be installed in the form of a hardware chip or other type of storage means that is provided separately from the factory-standard components of the device and then directly provided within the personal communications device after it is purchased by the user from a third-party provider.

In the exemplary embodiment shown in FIG. 1, the personal communications device 110 takes the form of a smartphone. Those skilled in the art will recognize that a smartphone is a high-end mobile phone which can combine the functions of a personal digital assistant and a mobile telephone. Current models such as the Blackberry® and iPhone® may also serve as portable media players and camera phones with high-resolution touchscreens. Such models include web browser functionality for accessing and properly displaying standard web pages, and for performing other network-based functions, through Wi-Fi and/or mobile broadband access.

The managed communications module 110a is operative to, when executed by a processor (see processor 322 in FIG. 3, for example), receive input data associated with sound from a user 102 of the personal communications device 110 and to cause the personal communications device 110 to send audio output data that includes input data associated with sound from the user 102 over a local wireless network link 125, 126, 127. The audio communications system 100 also includes a management module 132 that is executable on a management computer 130. As shown, the management computer 130 is separated from the personal communications device 110, and the management module 132 is operative to, when executed by a processor (see processor 422 in FIG. 4, for example), receive the audio output data from the managed communications module 110a over the local wireless network link 125, 126, 127. The management module 132 is further operative to perform at least one audio data processing function on the received audio output data, to generate processed audio data, by executing audio data processing module 136. In one embodiment, the data processing module 136 is configured to, when executed, perform noise filtering, bit-rate adjustment, noise stream combination from multiple connected personal communications devices and individual or combined sound processing, and/or alternative or additional audio processing functions associated with a standard audio equalizer system.

In the embodiment shown in FIG. 1, the local wireless network link is formed with a Wi-Fi connection 125 from the personal communications device 110 to a local area network (LAN) or an Ad-hoc network arrangement 126 that connects to the management computer 130 via a Wi-Fi connection 127. It should be appreciated that although an Ad-hoc arrangement according to the embodiment shown is formed by the personal communications device 110 and the management computer 130, alternatively an Ad-hoc network arrangement may be formed wherein a second personal communications device with local network capability is communicatively coupled to the personal communications device 110. The management module 132 is also executable to cause the management computer 130 to send the processed audio data to the managed communications module 110a over the local wireless network link 125, 126, 127. The processed audio data includes data configured for the managed communications module 110a and also data configured for sound output by a sound output means 138. The sound output means is physically separated from the portable communications device 110 and is connected to the management computer 130 via a standard audio cable or Wi-Fi communication link 137. In the embodiment shown, the sound output means 138 takes the form of a loudspeaker, which may include an amplifier that is suitable for large-scale projection of sound to an audience.

Figure 3:
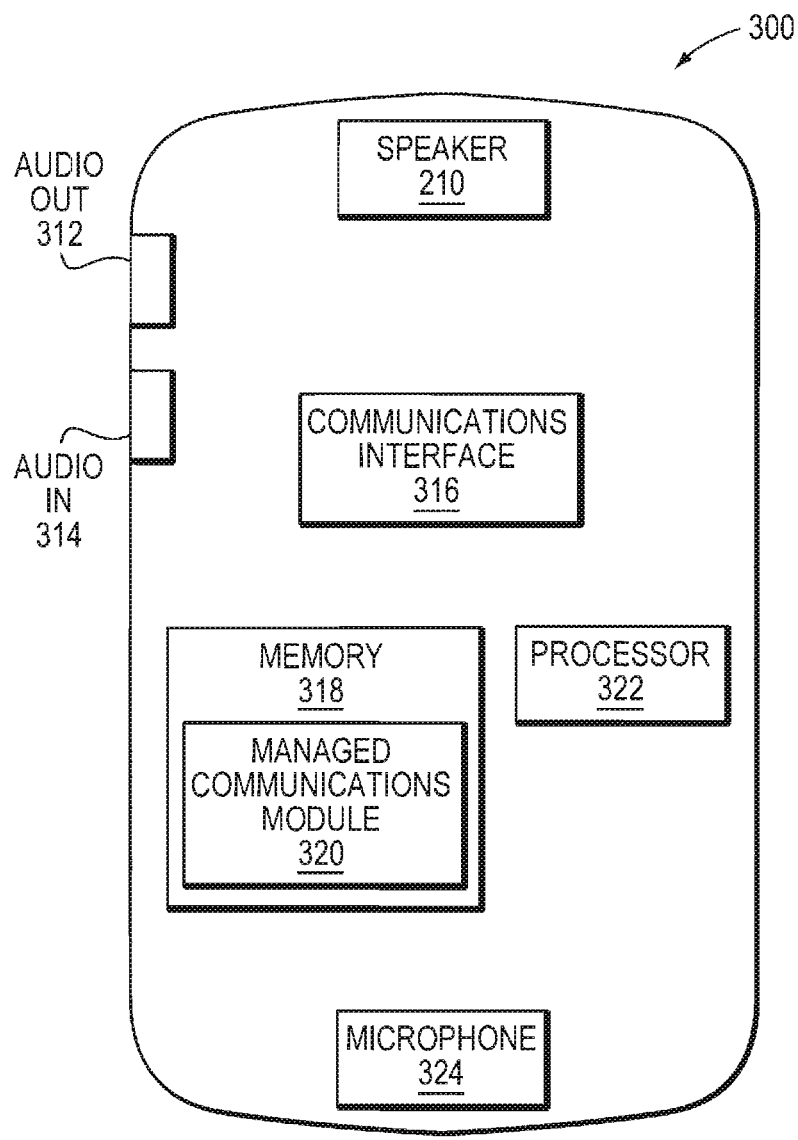
FIG. 3 schematically shows a personal communications device utilized according to one or more embodiments of the present invention.

The managed communications module 110a is operative to, when executed, receive the input data associated with the sound from the user 102 via a microphone of the personal communications device 110 (see microphone 324 in FIG. 3, for example). The managed communications module 110a is further operative to, when executed, receive the data configured for the managed communications module 110a over the local wireless network link 125, 126, 127 and to cause the personal communications device 110 to output sound to the user 102, based on the received data configured for the managed communications module 110a, via the speaker (see speaker 310 in FIG. 3, for example) of the personal communications device 110.

The function of causing the personal communications device 110 to output sound to the user 102 includes causing a sound output speaker of the personal communications device 110 to output the sound to the user 102 and/or causing a sound output connector or short-range wireless communications interface (see sound output connector 312 and communications interface 316 in FIG. 3, for example) of the personal communications device 110 to send user output data to a user sound output means over an audio cable or short-range wireless communications link. In one embodiment, the short-range wireless communications interface (see communications interface 316 in FIG. 3, for example) and short-range wireless communications link (see communications link 229 in FIG. 2, for example) are configured for Bluetooth® protocol communications.

The management module 132 executing on management computer 130 is further operative to, when executed, identify and authenticate the personal portable communications device 110 by executing a security module 134. The security module 134 is executable to perform device discovery and authentication functions, such as through handshaking and other device location and connecting operations known to those skilled in the art.

Figure 2:
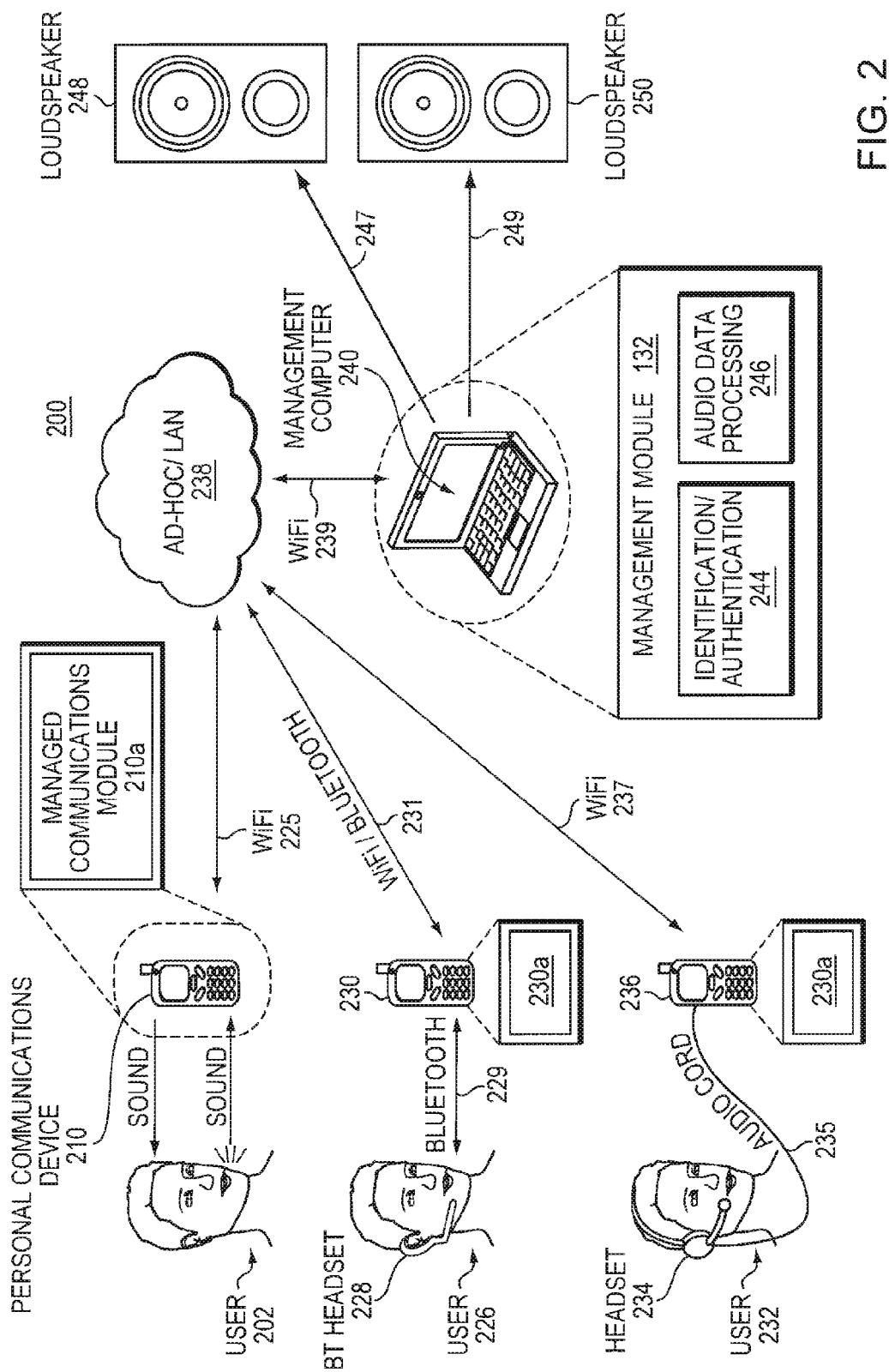
FIG. 2 schematically shows an audio communications system according to another embodiment of the present invention.

Now referring specifically to FIG. 2, according to one embodiment of the present invention, an audio communications system 200 is disclosed. The communications system 200 includes a plurality of managed communications modules 210a, 230a, 236a that are each executable on a corresponding one of a plurality of personal communications devices 210, 230, 236. Each of the managed communications modules 210a, 230a, 236a is operative to, when executed by a processor (see processor 322 in FIG. 3, for example), receive input data associated with sound from a corresponding user of a plurality of users 202, 226, 232 of the personal communications devices 210, 230, 236, and to cause the corresponding personal communications device to send audio output data that includes the input data associated with the sound from the corresponding user over a local wireless network link. The communications system 200 also includes a management module 242 that is executable on a corresponding management computer 230. The management module 242 is operative to, when executed by a processor (see processor 422 in FIG. 4, for example), receive the audio output data from each of the plurality of managed communications modules 210a, 230a, 236a over the local wireless network link (see, for example, link 225, 238, 239 for personal communications device 210). The management module 242 is further executable to perform one or more audio data processing functions by executing an audio data processing module 246. The audio data processing functions are performed on the received audio output data to generate processed audio data, and/or to cause the management computer 240 to send the processed audio data to the managed communications modules 210a, 230a, 236a over the corresponding local wireless network links, that is, link 225, 238, 239 for personal communications device 210, link 231, 238, 239 for personal communications device 230, and link 237, 238, 239 for personal communications device 236. The processed audio data includes data that is uniquely configured for each particular one of the managed communications modules 210a, 230a, 236a, and data configured for sound output by the sound output means 248 and/or sound output means 250. As shown, the sound output means 248, 250 are physically separated from the portable communications devices 210, 230, 236.

More specifically, in the embodiment shown in FIG. 2, three different users 202, 226, 232 each have a respective personal communications device 210, 230, 236. Each of the users 202, 226, 232 has audio interaction with their respective personal communications device through a different type of interface, in terms of audio input from the sound of their voice and audio output received from the personal communications device. Although in the embodiment shown, each user has a different type of audio interaction device and some of the personal communications devices have different communication links from the device to the management computer, it should be appreciated that numerous combinations and configurations of personal communications devices, communication links, and user sound output and input means may be used. Moreover, it should be appreciated that the type or model of personal communication devices may differ or be the same across the multiple users, as long as the personal communications device used is operative for short-range wireless network communications and/or Wi-Fi communications.

In operation, the user 202 enters spoken sound to the personal communications device 210 via the inherent, manufacturer-issued microphone component of the personal communications device 210. The sound output from the user is thereby entered as audio input into the personal communications device 210. Further, as shown, sound output is heard by the user 202 using the inherent, manufacturer-issued speaker of the personal communications device 210. Data communications corresponding to exchange of the audio data between the personal communications device 210 and the management computer 240 occur over a Wi-Fi connection link 225 to a network connection 238, such as a local area network (LAN) or Ad-hoc arrangement, which is connected to the management computer 240 over a Wi-Fi connection 239. The user 226 enters spoken sound and receives audio output via a headset 228 with microphone and earphone functionality. The personal communications device 230 is communicatively connected to the headset 228 via a short-range wireless connection, such as through Bluetooth® protocol communications. The personal communications device 230 is connected to the management computer 240 over a Wi-Fi or short-range wireless connection 231 to the network connection 238, then through a Wi-Fi connection 239 from the network connection 238 to the management computer 240. User 232 enters spoken sound and receives audio output via a headset 234 with microphone and earphone functionality. As shown, the headset 234 is connected to the personal communications device 236 by a standard stereo cord 235. The personal communications device 236 is communicatively connected to the management computer 240 by a Wi-Fi connection 237 to the network connection 238 and then from the network connection 238 to the management computer 240 over a Wi-Fi communication link 239.

It should be appreciated that although the embodiments described above refer to spoken vocal sounds from a human user as being the source of sound input to the personal communications device, the source of the sound may alternatively be an ambient noise other than noise that is vocally created by the user, for example the source may be a musical instrument played by the user, such as a guitar.

In one embodiment, performing the one or more data processing functions (by executing audio data processing module 246) includes generating a particular set of audio data for each one of the plurality of managed communications modules 210a, 230a, 236a. At least one particular set of audio data for at least one corresponding managed communications module (e.g. managed communications module 210a) is different from at least one other particular set for another at least one (e.g. managed communications module 230a) of the managed communications modules 210a, 230a, 236a. The particular sets of audio data may include communication addresses, settings, identification codes or authentication data, or other configuration settings necessary for communication with each specific one of the personal communications devices. Also, the audio data configured for each one of the managed communications modules may contain data that is particular to the user of the particular communication module.

According to one exemplary implementation, a small theater or other type of stage performance setting has three performers. Each of the performers has a respective personal communications device. The audio data coming to and from one of the performers should be configured to correspond to the audio that only that performer needs, apart from the other performers. For instance, the audio data to one performer is configured to provide sound output from the other two performers, and to provide immediate feedback of the sound of the voice from that particular performer, to his or her respective personal communications device for purposes of reference while speaking. In another exemplary context, three academic lecturers participate in a collective panel discussion. While each one of the lecturers wants to receive instant feedback to hear the modulation of his or her own voice clearly, that lecturer also wants to receive audio corresponding to what the other two lecturers are saying, in real-time. Accordingly, the management computer 240 with management module 242 should be operative to parse the audio data to be received and to be output to each of the respective users based on the particular needs of each user.

Although the embodiment of FIG. 2 shows three users 202, 226, 232, it should be appreciated that more or less users may be accommodated and their corresponding audio managed by the same general configuration of the communication links and management computing systems, provided that the networks and computing power have sufficient capacity for managing input and output for all of the users, and for effectively outputting sound to an audience using a loudspeaker-type device without generating significant sound quality or processing speed degradation.

Each one of the managed communications modules 210a, 230a, 236a is operative to, when executed by a processor (see processor 322 in FIG. 3, for example) receive the corresponding set of audio data for the corresponding managed communications module and to cause the personal communications device to output sound to the corresponding user based on the received set of audio data. A management module 242 executes on the management computer 240. The management computer 240 is separated from the personal communications devices 210, 230, 236, and the management module 242 is operative to, when executed by a processor (see processor 422 in FIG. 4, for example), receive the audio output data from the managed communications modules over the communication links 225, 231, 237, 238, 239. Audio data processing functions are performed on the received audio output data to produce processed audio data, by executing the audio data processing module 246. In one embodiment, the data processing module 246 is executable to perform noise filtering, bit-rate adjustment, noise stream combination from multiple connected personal communications devices and individual or combined sound processing, and/or alternative or additional audio processing functions associated with a standard audio equalizer system.

The processed audio data includes data that is configured for the particular managed communications modules 210a, 230a, 236a and also data configured for sound output by sound output means 248 and/or sound output means 250 separated from the portable communications devices. As shown, the sound output means 248, 250 are connected to the management computer 240 via standard audio cables or Wi-Fi connections 247, 249. In the embodiment shown, the sound output means 248 and 250 are in the form of loudspeakers, which may include corresponding amplifiers suitable for large-scale projection of sound to an audience.

The management module 242 executing on management computer 240 is further operative to, when executed, identify and authenticate each of the personal portable communications devices 210, 230, 236 by executing a security module 244, labeled in FIG. 2 as an "identification/authentication" module. The security module 244 is configured to, when executed, perform device discovery and authentication activities, such as through handshaking and according to other device location and connection functions known to those skilled in the art.

Now referring specifically to FIG. 3, an exemplary personal communications device is schematically shown, for use in audio communication systems and methods according to one or more embodiments of the present invention. As shown, the personal communications device 300 includes an output speaker 310 and an audio output connector 312, such as a headphone output jack. An audio input connector 314 is also provided, for example an auxiliary input microphone jack. Sound generated by a user is received by the microphone 324. A memory device 318 is operative to store a managed communications module 320. The personal communications device 300 further includes a processor 322 and a communications interface 316. The processor 322 is operative to execute the managed communications module 320 and to cause the communications interface 316, which may be configured for short-range wireless, LAN, WAN, or Wi-Fi communications, to perform communication functions between the personal communications device 300 and a remote management computer (not shown) that is operative to perform audio data processing functions based on the received input data from the personal communications device 300.

Figure 4:
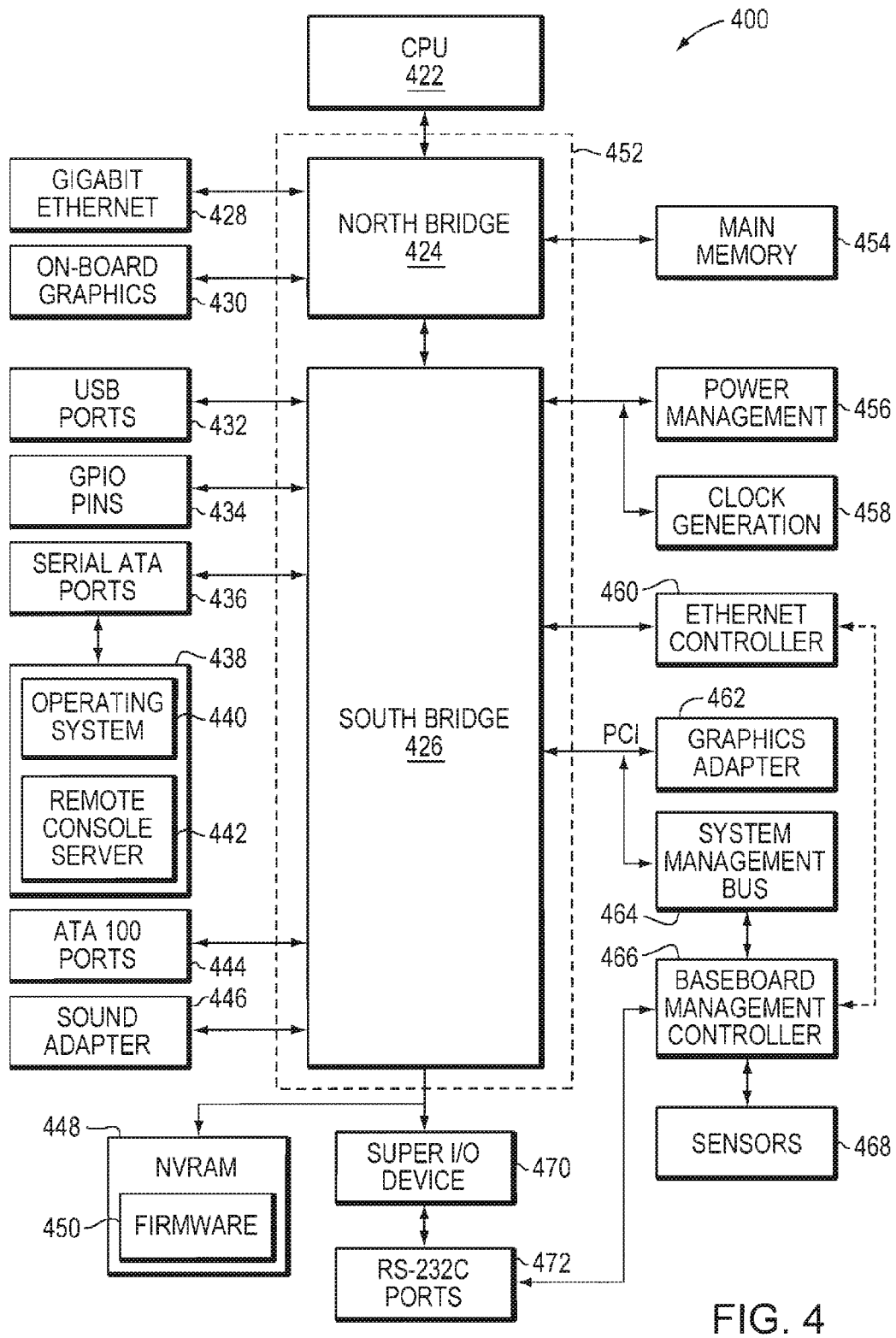
FIG. 4 schematically shows computer architecture for various computing systems utilized according to one or more embodiments of the present invention.

Now referring specifically to FIG. 4, computer architecture is schematically shown for various computing systems utilized according to one or more embodiments of the present invention. The architecture shown in FIG. 4 corresponds to a computer 400 having a baseboard, or "motherboard", which is a printed circuit board to which components or devices may be connected by way of a system bus or other electric communication path. In one embodiment, a central processing unit ("CPU") 422 operates in conjunction with a chipset 452. The CPU 422 is a standard central processor that performs arithmetic and logical operations necessary for the operation of the computer. The chipset 452 includes a north bridge 424 and a south bridge 426, where the north bridge 424 provides an interface between the CPU 422 and the remainder of the computer 400. The north bridge 424 also provides an interface to a random access memory ("RAM") used as the main memory 454 in the computer 400 and, optionally, to an onboard graphics adapter 440. The north bridge 424 may also include functionality for providing networking functions through a gigabit Ethernet adapter 428. The gigabit Ethernet adapter 428 is operative to connect the computer 400 to another computer via a network. Connections which may be made by the network adapter 428 include LAN or WAN connections. As shown, the north bridge 424 is connected to the south bridge 426.

The south bridge 426 is operative to control many of the input/output functions of the computer 400. In particular, the south bridge 426 may provide one or more universal serial bus ("USB") ports 442, an Ethernet controller 460, and one or more general purpose input/output ("GPIO") pins 444. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment ("SATA") adapter for providing one or more serial ATA ports 446. The serial ATA ports 446 may be, in turn, connected to one or more mass storage devices storing an operating system 440 and application programs 442, such as the SATA disk drive 448. Those skilled in the art will recognize that an operating system 440 has a set of programs that control operations of a computer and allocation of resources. An application program is software that runs on top of the operating system software, or other runtime environment, and uses computer resources to perform application specific tasks desired by the user.

The mass storage devices connected to the south bridge 426, and their associated computer-readable media, provide non-volatile storage for the computer 400. Although the description of computer-readable media contained herein refers to a mass storage device such as a hard disk or CD-ROM drive, those skilled in the art will recognize that computer-readable media can be any available media that can be accessed by the computer 400. Computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400.

As described briefly above, the south bridge 426 may include a system management bus 464. The system management bus 464 may include a baseboard management controller ("BMC") 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

It should be appreciated that although the computer 400 shown in the embodiment of FIG. 4 is described in the context of a server computer, other types of computer system configurations may be used, such as multiprocessor systems, minicomputers, or personal desktop or laptop computers. It is also contemplated that the computer 400 may not include all of the components shown in FIG. 4 and/or may include other components that are not explicitly shown in FIG. 4.

Now referring to FIGS. 1-4, in one aspect, the present invention relates to a communications system 100. In one embodiment, the communications system 100 includes a managed communications module 110a that is executable on a personal communications device 110. The managed communications module 110a is operative to, when executed by a processor (see e.g. processor 322 of exemplary personal communications device 300 shown in FIG. 3), receive input data associated with sound from a user 102 of the personal communications device 110 and to cause the personal communications device 110 to send audio output data including the input data associated with sound from the user 102 over a local wireless network link 125, 126, 127. The communications system 100 also includes a management module 132 that is executable on a management computer 130. The management computer 130 is separated from the personal communications device 110, and the management module 132 is operative to, when executed by a processor (see e.g. processor 422 of exemplary computing device 400 shown in FIG. 4), receive the audio output data from the managed communications module 110a over the local wireless network link 125, 126, 127 and to perform at least one audio data processing function (by executing audio data processing module 136) on the received audio output data to generate processed audio data. The management module 132 is also operative to, when executed, cause the management computer 130 to send the processed audio data to the managed communications module 110a over the local wireless network link 125, 126, 127. The processed audio data includes data configured for the managed communications module 110a and also data configured for sound output by a sound output means 138 that is separated from the portable communications device 110.

In one embodiment, the managed communications module 110a is further operative to, when executed, receive the input data associated with the sound from the user 102 via at least one of a microphone, audio input connector and short-range wireless communications interface (see e.g. microphone 324, audio input connector 314, and communications interface 316, respectively, of exemplary communications device 300 shown in FIG. 3) of the personal communications device 110.

In one embodiment, the managed communications module 110a is further operative to, when executed, receive the data configured for the managed communications module 110a over the local wireless network link 125, 126, 127 and to cause the personal communications device 110 to output sound to the user 102 based on the received data configured for the managed communications module 110a.

In one embodiment, the function of causing the personal communications device 110 to output sound to the user 102 includes causing a sound output speaker (see e.g. speaker 310 in the exemplary personal communications device 300 shown in FIG. 3) of the personal communications device 110 to output the sound to the user 102 and/or causing a sound output connector or short-range wireless communications interface (see e.g. sound output connector 312 and communications interface 316, respectively, of exemplary personal communications device 300 shown in FIG. 3) of the personal communications device 110 to send user output data to a user sound output means over an audio cable (see e.g. user 232 with headset 234 connected by audio cord 235) or short-range wireless communications link (see e.g. user 226 with Bluetooth headset 228 connected by Bluetooth communications link 229), respectively.

In one embodiment, the short-range wireless communications interface (see e.g. communications interface 316 of exemplary personal communications device 300 in FIG. 3) and short-range wireless communications link (see e.g. Bluetooth communications link 229) are configured for Bluetooth protocol communications.

In one embodiment, the local wireless network link 125, 126, 127 includes an ad-hoc network or a local area network (LAN) connection 126.

In one embodiment, the management module 132 is further operative to, when executed, identify and authenticate the personal portable communications device 110 (by executing security module 134).

In one embodiment, the audio data processing functions include noise filtering and/or bit-rate adjustment.

In one embodiment, the personal communications device 110 is operative as a telephone.

In one embodiment, the sound output means 138 separated from the personal communications device 110 includes a loudspeaker 138 that is operatively coupled to the management computer 130.

In another aspect, the present invention relates to a communications system 200. In one embodiment, the communications system 200 includes a plurality of managed communications modules 210a, 230a, 236a that are each executable on a corresponding one of a plurality of personal communications devices 210, 230, 236. Each of the managed communications modules 210a, 230a, 236a is operative to, when executed by a processor (see e.g. processor 322 in exemplary personal communications device 300 shown in FIG. 3), receive input data associated with sound from a corresponding user (e.g. user 202) of a plurality of users 202, 226, 232 of the personal communications devices 210, 230, 236 and to cause the corresponding personal communications device (e.g. personal communications device 210 corresponding to user 202) to send audio output data including the input data associated with the sound from the corresponding user (e.g. user 202) over a local wireless network link (e.g. link 225, 238, 239 for personal communications device 210). The communications system 200 also includes at least one management module 242 that is executable on at least one corresponding management computer 230. The at least one management module 242 is operative to, when executed by a processor (see e.g. processor 422 of exemplary computing device 400 shown in FIG. 4), receive the audio output data from each of the plurality of managed communications modules 210a, 230a, 236a over the local wireless network link (e.g. link 225, 238, 239 for personal communications device 210). The at least one management module 242 is further operative to, when executed, perform at least one audio data processing function (by executing audio data processing module 246) on the received audio output data to generate processed audio data, and/or to cause the at least one management computer 240 to send the processed audio data to the managed communications modules 210a, 230a, 236a over the corresponding local wireless network links (link 225, 238, 239 for personal communications device 210; link 231, 238, 239 for personal communications device 230; and link 237, 238, 239 for personal communications device 236). The processed audio data includes data configured for each particular one of the managed communications modules 210a, 230a, 236a and data configured for sound output by at least one sound output means 248, 250 physically separated from the portable communications devices 210, 230, 236.

In one embodiment, performing the at least one audio data processing function (by executing audio data processing module 246) includes generating a particular set of audio data for each one of the plurality of managed communications modules 210a, 230a, 236a. At least one particular set of audio data for at least one corresponding managed communications module (e.g. managed communications module 210a) is different from at least one other particular set for another at least one (e.g. managed communications module 230a) of the managed communications modules 210a, 230a, 236a.

In one embodiment, each one of the managed communications modules 210a, 230a, 236a is operative to, when executed, receive the corresponding set of audio data for the corresponding managed communications module and to cause the personal communications device (a corresponding one of the personal communications devices 210, 230, 236) to output sound to the corresponding user (a corresponding one of users 202, 226, 232) based on the received set of audio data.

In one embodiment, the function of causing each of the personal communications devices 210, 230, 236 to output sound to the user (a corresponding one of the users 202, 226, 232) includes causing a sound output speaker (see e.g. speaker 310 of exemplary personal communications device 300 shown in FIG. 3) of the personal communications device (e.g. personal communications device 210) to output the sound to the user (e.g. user 202) and/or causing a sound output connector or short-range wireless communications interface (see e.g. sound output connector 312 and communications interface 316 of exemplary personal communications device 300 shown in FIG. 3) of the personal communications device (e.g. personal communications device 210) to send user output data to a user sound output means (e.g. within corded headset 234 or Bluetooth headset 228) over an audio cable 235 or short-range wireless communications link 229, respectively.

In one embodiment, the managed communications module 210a, 230a, 236a for each one of the personal communications devices 210, 230, 236 is operative to, when executed, receive the audio input data associated with the sound generated by the user (e.g. user 202) via at least one of a microphone, audio input connector, and short-range wireless communications interface (see e.g. microphone 324, audio input connector 314, and communications interface 316, respectively, of exemplary communications device 300 shown in FIG. 3) of the personal communications device (one of the communications devices 210, 230, 236).

In one embodiment, the local wireless network link (e.g. link 225, 238, 239 for personal communications device 210) includes an ad-hoc network or local area network (LAN) connection 238.

In one embodiment, each of the plurality of personal communications devices 210, 230, 236 is operative as a telephone.

In yet another aspect, the present invention relates to a method for enabling audio communications. In one embodiment, the method includes the step of installing a managed communications module 110a on a personal communications device 110. The managed communications module 110a is operative to, when executed by a processor (see e.g. processor 322 of exemplary personal communications device 300 shown in FIG. 3), perform functions that include receiving input data associated with sound from a user 102 of the personal communications device 110 and causing the personal communications device 110 to send audio output data including the input data associated with sound from the user 102 over a local wireless network link 125, 126, 127. The method also includes the step of installing a management module 132 on a management computer 130 that is separated from the personal communications device 110. The management module 132 is operative to, when executed by a processor (see e.g. processor 422 of exemplary computing device 400 shown in FIG. 4), receive the audio output data from the managed communications module 110a over the local wireless network link 125, 126, 127 and to perform at least one audio data processing function (by executing audio data processing module 136) on the received audio output data to generate processed audio data. The management module 132 is also operative to, when executed, cause the management computer 130 to send the processed audio data to the managed communications module 110a over the local wireless network link 125, 126, 127. The processed audio data includes data configured for the managed communications module 110a and data configured for sound output by a sound output means 138 separated from the portable communications device 110.

In one embodiment, the managed communications module 110a is further operative to, when executed, receive the input data associated with the sound from the user 102 via at least one of a microphone, audio input connector, and short-range wireless communications interface (see e.g. microphone 324, audio input connector 314, and communications interface 316, respectively, of exemplary communications device 300 shown in FIG. 3) of the portable communications device 110.

In one embodiment, the managed communications module 120 is further operative to, when executed, receive the data configured for the managed communications module 110a over the local wireless network link 125, 126, 127 and to cause the personal communications device 110 to output sound to the user 102 based on the received data configured for the managed communications module 110a.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A communications system, comprising:
   (a) first and second personal communications devices, each comprising a processor, a sound input device, a sound output device and a managed communications module, wherein the first personal communications device is configured to receive spoken words, and the second personal communications device is configured to output the received spoken words; and
   (b) a management computer physically separated from the first and second personal communications devices, the management computer comprising a processor, a sound output device and a management module;
   wherein for each of the first and second personal communication devices, the managed communications module of the personal communications device is configured to, when executed at the processor of the personal communications device:
      (i) when the personal communications device is the first personal communications device, receive a sound input signal from the sound input device, and send the sound input signal as audio output data to the management computer over a wireless network link, wherein the sound input signal is in representation of the spoken words received by the sound input device of the first personal communications device; and
      (ii) when the personal communications device is the second personal communications device, receive processed audio data from the management module of the management computer, and control the sound output device of the second personal communications device to output the spoken words based on personal device output data of the processed audio data;
   wherein the management module is configured to, when executed at the processor of the management computer:
      (i) receive the audio output data from the managed communications module of the first personal communications device over the wireless network link;
      (ii) perform at least one audio data processing function on the received audio output data from the first personal communications device to generate the processed audio data, wherein the processed audio data is in representation of the spoken words received by the sound input device of the first personal communications device, and comprises the personal device audio data in accordance to the sound output device of the second personal communications device and computer sound output data in accordance to the sound output device of the management computer;
      (iii) transmit the processed audio data to the second personal communications device, such that the managed communications module of the second personal communications device controls the sound output device of the second personal communications device to output the spoken words based on the personal device output data of the processed audio data; and
      (iv) transmit the processed audio data as a first output signal to the sound output device of the management computer, and control the sound output device of the management computer to output the spoken words based on the computer sound output data of the processed audio data.

2. The system of claim 1, wherein the sound input device comprises at least one of a microphone, an audio input connector, or a short-range wireless communications interface.

3. The system of claim 1, wherein the managed communications module of the second personal communications device is configured to control the sound output device of the second personal communications device to output the spoken words by:
   (a) when the sound output device of the second personal communications device is a sound output speaker, controlling the sound output speaker of the second personal communications device to output the spoken words;
   (b) when the sound output device of the second personal communications device is a sound output connector, controlling the sound output connector of the second personal communications device over an audio to output the spoken words; and
   (c) when the sound output device of the second personal communications device is a short-range wireless communications interface, controlling the short-range wireless communications interface of the second personal communications device over a short-range wireless communications link to output the spoken words.

4. The system of claim 3, wherein the short-range wireless communications interface and the short-range wireless communications link are configured for Bluetooth protocol communications.

5. The system of claim 1, wherein the wireless network link comprises an ad-hoc network or a wireless local area network (WLAN) connection.

6. The system of claim 1, wherein the management module is further configured to, when executed, identify and authenticate the first and second personal communications devices.

7. The system of claim 1, wherein the at least one audio data processing function comprises noise filtering and bit-rate adjustment.

8. The system of claim 1, wherein each of the first and second personal communications devices is operative as a telephone.

9. The system of claim 1, wherein the sound output device of the management computer is a loudspeaker operatively coupled to the management computer.

10. A communications system, comprising:
   (a) a plurality of personal communications devices, each comprising a processor, a sound input device, a sound output device and a managed communications module, wherein each of the personal communications device is configured to serve as one of a first personal communications device configured to receive spoken words and a second personal communications device configured to output the received spoken words; and
   (b) at least one management computer physically separated from the personal communications devices, wherein each of the at least one management computer comprises a processor, a sound output device and a management module;
   wherein for each personal communication device, the managed communications module is configured to, when executed by the processor of the personal communications device:
      (i) when the personal communications device serves as the first personal communications device, receive a sound input signal from the sound input device, and send the sound input signal as audio output data to the management computer over a wireless network link, wherein the sound input signal is in representation of the spoken words received by the sound input device of the first personal communications device; and
      (ii) when the personal communications device serves as the second personal communications device, receive processed audio data from the management module of the management computer, and control the sound output device of the second personal communications device to output the spoken words based on personal device output data of the processed audio data;
   wherein the management module is configured to, when executed by the processor of the management computer:
      (i) receive the audio output data from the managed communications module of the first personal communications device over the wireless network link;
      (ii) perform at least one audio data processing function on the received audio output data to generate the processed audio data, wherein the processed audio data is in representation of the spoken words received by the sound input device of the first personal communications device, and comprises personal device audio data in accordance to the sound output device of the second personal communications device and computer sound output data in accordance to the sound output device of the management computer; and
      (iii) transmit the personal device audio data of the processed audio data to the managed communications module of the second personal communications device over the wireless network link such that the managed communications module of the second personal communications device controls the sound output device of the second personal communications device to output the spoken words based on the personal device output data of the processed audio data; and
      (iv) transmit the computer sound output data of the processed audio data to the sound output device of the management computer, and control the sound output device of the management computer to output the spoken words received by the sound input device of the first personal communications device based on the computer sound output data of the processed audio data.

11. The system of claim 10, wherein two or more of the personal communications devices simultaneously serve as the second personal communication devices, and at least one of the personal device audio data for one of the second personal communications devices is different from at least one other personal device audio data for another one of the second personal communications devices.

12. The system of claim 10, wherein for each of the personal communications devices serving as the second personal communications device, the managed communications module is configured to control the sound output device of the second personal communications device to output the spoken words by:
   (a) when the sound output device of the second personal communications device is a sound output speaker, controlling the sound output speaker of the second personal communications device to output the spoken words;
   (b) when the sound output device of the second personal communications device is a sound output connector, controlling the sound output connector of the second personal communications device over an audio cable to output the spoken words; and
   (c) when the sound output device of the second personal communications device is a short-range wireless communications interface, controlling the short-range wireless communications interface of the second personal communications device over a short-range wireless communications link to output the spoken words.

13. The system of claim 12, wherein for each personal communications device, the sound input device comprises at least one of a microphone, an audio input connector, and the short-range wireless communications interface.

14. The system of claim 10, wherein the wireless network link comprises an ad-hoc network or wireless local area network (WLAN) connection.

15. The system of claim 10, wherein each of the plurality of personal communications devices is operative as a telephone.

16. A method for enabling audio communications, comprising:
   (a) receiving, by a managed communications module executed at a first personal communications device, a sound input signal from a sound input device of the first personal communications device, wherein the sound input signal is in representation of spoken words received by the sound input device of the first personal communications device;
   (b) sending, by the managed communications module executed at the first personal communications device, the sound input signal as audio output data over a wireless network link to a management computer, wherein the management computer is physically separated from the first personal communications device;

(c) receiving, by a managed communications module executed at a second personal communications device, personal device audio data of processed audio data from the management computer over the wireless network link, wherein the management computer is physically separated from the second personal communications device, wherein the processed audio data is in representation of the spoken words received by the sound input device of the first personal communications device, and wherein the personal device audio data is in accordance to a sound output device of the second personal communications device; and (d) controlling, by the managed communications module executed at the second personal communications device, the sound output device of the second personal communications device to output the spoken words based on the personal device output data of the processed audio data;

wherein the management computer comprises a processor, a sound output device and a management module, wherein the management module is configured to, when executed by the processor of the management computer:

(i) receive the audio output data from the managed communications module of the first personal communications device over the wireless network link;

(ii) perform at least one audio data processing function on the received audio output data from the first personal communications device to generate the processed audio data, wherein the processed audio data comprises the personal device audio data in accordance to the second personal communications device and computer sound output data processed in accordance to the sound output device of the management computer; and (iii) send the personal device audio data to the managed communications module of the second personal communications device over the local wireless network link; and (iv) transmit the computer sound output data of the processed audio data to the sound output device of the management computer, and control the sound output device of the management computer to output the spoken words based on the computer sound output data of the processed audio data.

17. The method of claim 16, wherein the sound input device of the personal communications device comprises at least one of a microphone, an audio input connector, and a short-range wireless communications interface.

* * * * *